Dec. 22, 1953 C. HERZOG 2,663,120
APPARATUS FOR FORMING ARTICLES
Filed Sept. 21, 1950 7 Sheets-Sheet 5

INVENTOR
C. HERZOG
BY W.C. Parnell
ATTORNEY

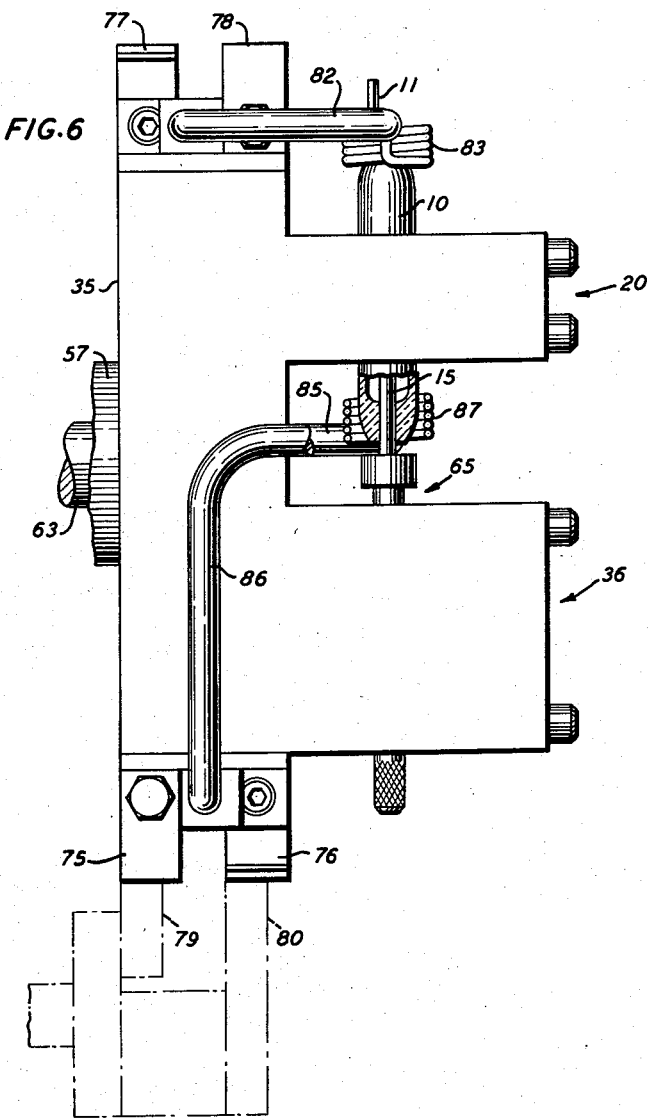

Dec. 22, 1953   C. HERZOG   2,663,120
APPARATUS FOR FORMING ARTICLES
Filed Sept. 21, 1950   7 Sheets-Sheet 7
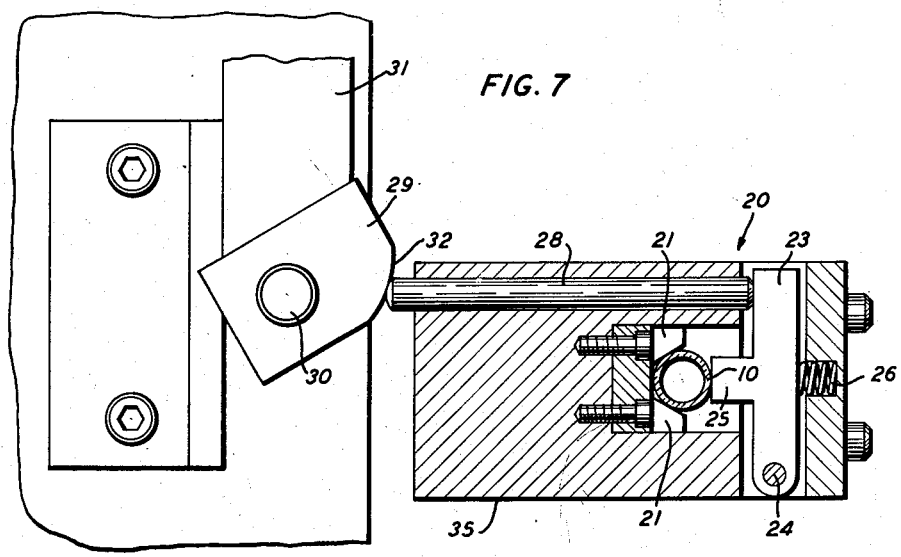
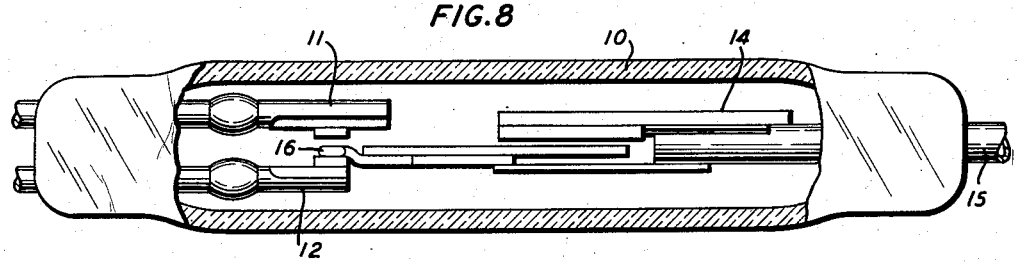
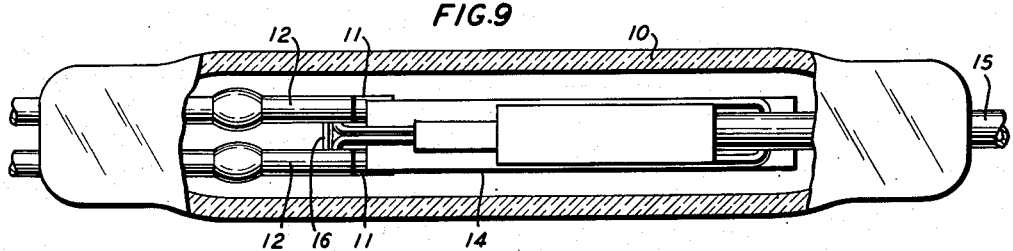
INVENTOR
C. HERZOG
BY
W.A. Parnell
ATTORNEY Patented Dec. 22, 1953

2,663,120

UNITED STATES PATENT OFFICE 2,663,120

APPARATUS FOR FORMING ARTICLES

Carl Herzog, Belleville, N. J., assignor to Western Electric Company, Incorporated, New York, N. Y., a corporation of New York Application September 21, 1950, Serial No. 186,005

4 Claims. (Cl. 49—1)

This invention relates to apparatus for forming articles and more particularly to apparatus for forming mercury switches.

The type mercury switch to be manufactured by the present embodiment of the invention was designed particularly for use in the telephone industry and includes a glass envelope, tubular in general contour and of a given length whereby contacts may be sealed in one end thereof and an armature sealed in the opposite end thereof. The manufacture of this tube presented various problems including, first, the support of a glass tube at a given position, second, the location of the contacts, which in the present instance included two pairs, so that they would be accurately located not only with respect to each other but with respect to the center line of the glass tube before the adjacent end of the glass tube was fused, sealing the contacts in place. Another problem included the accurate location of the armature within the glass tube relative to the contacts so that when it was sealed in the opposite end of the tube, the innermost end of the armature would be accurately positioned with respect to the pairs of contacts.

An object of the present invention is to provide an apparatus for forming articles wherein the various parts or units to form the article may be accurately positioned with respect to each other.

With this and other objects in view, the invention comprises an apparatus for holding a receptacle, such as a glass tube, at a given position and successively locating other parts of the article within the receptacle for mounting therein.

In the present embodiment of the invention, the apparatus includes a support with reference surfaces to receive, in a predetermined order, holders for parts to be assembled in the glass tube, these holders having reference surfaces to engage their respective reference surfaces of the support and to be latched in place so that the parts carried by the holders will be accurately located within the glass tube.

Other objects and advantages will be apparent from the following detailed description when considered in conjunction with the accompanying drawings wherein:

Fig. 6 illustrates the structure shown in Fig. 5 but in reverse position, completing the sealing operation of the glass tube;

Fig. 7 is an enlarged fragmentary sectional view of the tube holding chuck; and

Figs. 8 and 9 are detailed views of the mercury switch completed through the aid of this apparatus.

Figure 1:
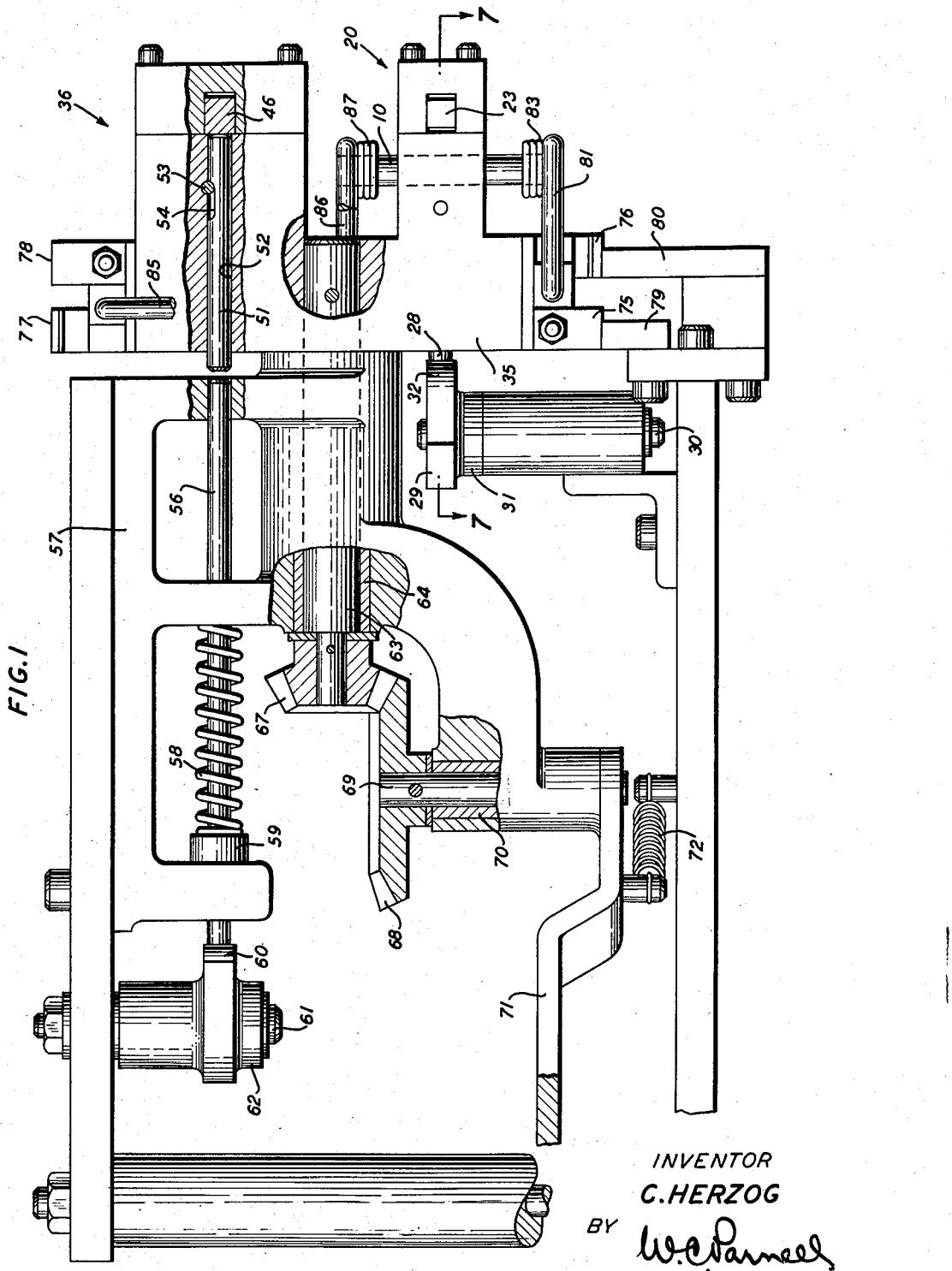
Fig. 1 is a side elevational view of the apparatus, portions thereof being shown in section.

Referring now to the drawings, attention is first directed to Figs. 8 and 9 which illustrate the article or mercury switch to be assembled through the aid of this apparatus. The mercury switch includes a glass envelope or tube 10 of a given length which in reality is approximately two inches or less than one third the size shown in Figs. 8 and 9. There are two pairs of contacts 11 and 12 to be mounted given distances apart and at a definite position in one end of the glass envelope. An armature unit 14 supported mainly by a metallic tube 15 includes a contact engaging end 16 which must be positioned between the pairs of contacts 11 and 12 and in engagement with the contacts 12 as illustrated in Fig. 8.

The apparatus for forming the mercury switch includes a chuck 20 (Figs. 1, 5 and 7) having spaced blocks 21 with tapered surfaces to be engaged by the glass tube 10 and serve to accurately locate the tube with its center line in a given position. A latch 23 pivoted at 24 and having an engaging portion 25 is normally urged inwardly by a spring 26 to force the glass tube 10 into engagement with the tapered surfaces of the blocks 21 and hold it in position. A pin 28 is slidable in an aperture of the chuck 20, its outer end being positioned to be engaged by a cam 29 rotatable about the axis of a shaft 30 through the aid of a handlever 31. The rounded surface 32 of the cam is eccentric with respect to the center line of the shaft 30 so that actuation of the lever 31 will move the pin 28 to the right (Fig. 7) to move the latch 23 to free the tube 10 or to open the chuck for the reception of a new tube.

The chuck 20 is integral with a head 35 which also includes a support 36 for holders for the contacts 11 and 12 and the armature 14. The support 36 (shown in Figs. 1 to 6 inclusive) includes an aperture 37 disposed in alignment with the tube holding portion of the chuck 20 and is provided with three reference surfaces 40 at the two sides and innermost portion thereof to serve in accurately locating the holders for the contacts and armature. The term "reference surfaces" is intended to imply that these surfaces are accurately machined to lie in known planes relative to each other and relative to the chuck 20 as shown in Figs. 2, 4 and 5. The three reference surfaces 40, as shown in Fig. 2, compose the three surfaces of the apertures 37. The holder for the contacts is indicated generally at 41 and is shown in Fig. 4. This holder includes a main member 42 having a cross sectional contour similar to the aperture 37 and with three reference surfaces 43 to engage the reference surfaces 40 whereby the contacts 11 and 12, accurately positioned in the opposite end of the holder, will be properly located within the lower end of the glass tube. The three reference surfaces 43 of the holder 41 are accurately machined to lie in known planes relative to each other and relative to the contact holding end whereby the contacts will be in known positions relative to each other and the reference surfaces 43. The dimensions of the reference surfaces 40 and 43 are such that the portion 42 of the holder 41 may be moved into the aperture 37 and held in only the correct position determined by the engagement of the respective reference surfaces. While positioning the holder 41 in the aperture 37 of the support 36, it is moved downwardly to cause the contacts 11 and 12 to move through the tube 10 to the positions shown in Fig. 4 where they will be located in the lower end of the tube. During this time and until the contacts are secured in the end of the tube, the lower portion of the holder will be positioned in the tube. A spring-pressed plunger 45 mounted in the head 35 normally urges the holder 41 or the other holder for the armature, to be hereinafter described, to the right when these holders are released by the latch 46. The latch 46 is shown more in detail in Fig. 2, it being pivotedly supported at 47, provided with an engaging member 48 and normally urged clockwise into engagement with either holder through the aid of its spring 49.

A latch releasing mechanism includes a plunger 51 slidably disposed in an aperture 52 of the support 36 limited in its movement by a pin 53 disposed at a fixed position and extending transversely of the plunger in a cutaway portion 54 thereof. The plunger 51, when the head 35 is in the position shown in Figs. 1 to 5 inclusive, is in alignment with a push rod 56 supported for sliding movement in apertured portions of the frame 57 and normally urged to the left (Figs. 1 and 2) by the aid of a spring 58 limited by a collar 59. A cam 60 mounted for rotation about an axis 61 through the aid of a handlever 62 will move the push rod 56 against the force of the spring 58 to engage and actuate the plunger 54 to move the latch 46 into open position against the force of its spring 49.

The holder 41 for the contacts 11 and 12 is the subject matter of the applicant's copending application, Serial No. 186,004, filed September 21, 1950, and for this reason the detailed structures of this holder, particularly the contact holding portion thereof, are not shown. A holder 65 for the armature 14 shown in Figs. 5 and 6 is the subject matter of applicant's copending application, Serial No. 186,003, filed September 21, 1950, and for this reason the detailed structures of this holder, including the means whereby the armature may be accurately located with respect to the reference surfaces 66 of the holder 65, are not shown. There are three reference surfaces 66 of the holder 65 accurately machined to lie in known planes relative to each other and relative to the armature holding end and the armature held thereby, whereby the armature will be in a known position relative to the reference surfaces 66. The dimensions of the reference surfaces 66 and 40 are such that the portion of the holder 65 including the reference surfaces 66 may be moved into the aperture 37 and held in only the correct position determined by the engagement of these reference surfaces. Through this means the mere mounting of the holder 65 in the aperture 37 will assure accurate location of the armature in the upper end of the tube 10.

Figure 2:
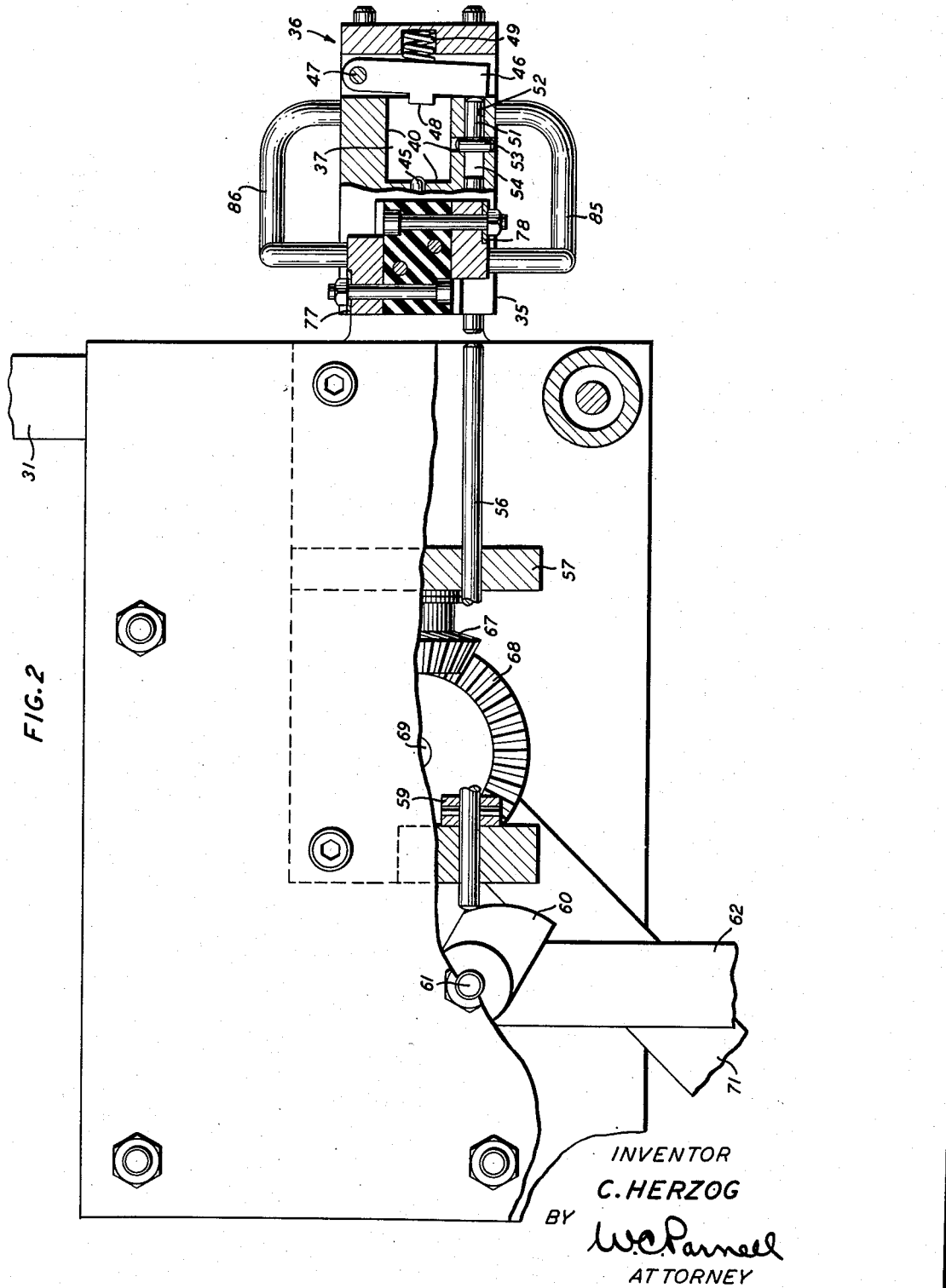
Fig. 2 is a top plan view of the apparatus, portions thereof being broken away.

The head 35 as shown in Figs. 1 and 4 is rigidly mounted on the outer end of a shaft 63, the shaft being journalled in a bearing 64 of the bracket 57. A beveled gear 67 is mounted on a reduced inner end of the shaft 63 and interengages a larger beveled gear 68. The beveled gear 68 is mounted on the upper end of a vertical shaft 69 which is journalled in a bearing 70 of the bracket 57, the lower end of the shaft being fixed to a lever 71, normally urged into the present position by a spring 72. The lever 71 may be operated by a suitable cam or manually operated depending upon whether or not one head 35 is employed or a multiplicity of heads on a turret type machine. The purpose of the lever 71 is to rock the shaft 69 to rotate the beveled gears 68 and 67, rotating the shaft 63 and thus rotating the head 35 180° or any distance desired depending upon the position required during the various steps of the method.

Figure 3:
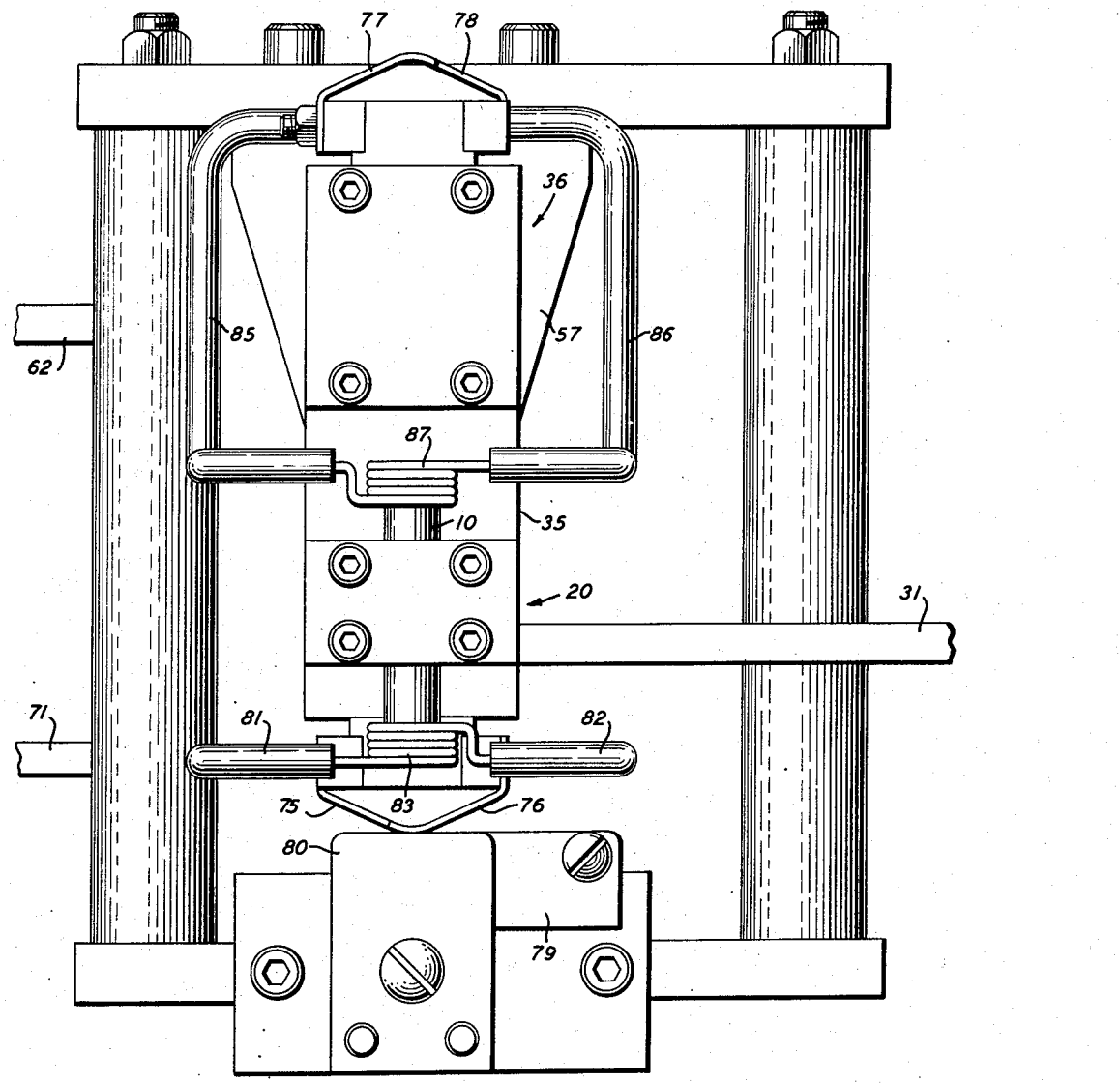
Fig. 3 is a front elevational view of the apparatus.
Figure 4:
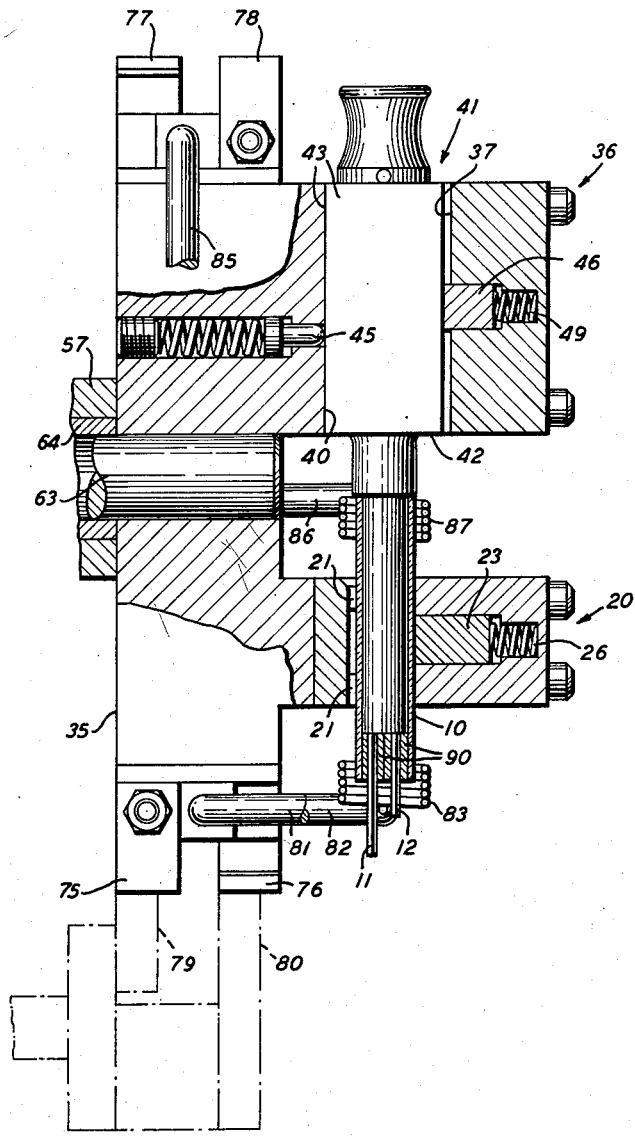
Fig. 4 is a fragmentary vertical sectional view of a portion of the apparatus illustrating the glass tube mounted in position and the holder for the contacts mounted in its support.
Figure 5:
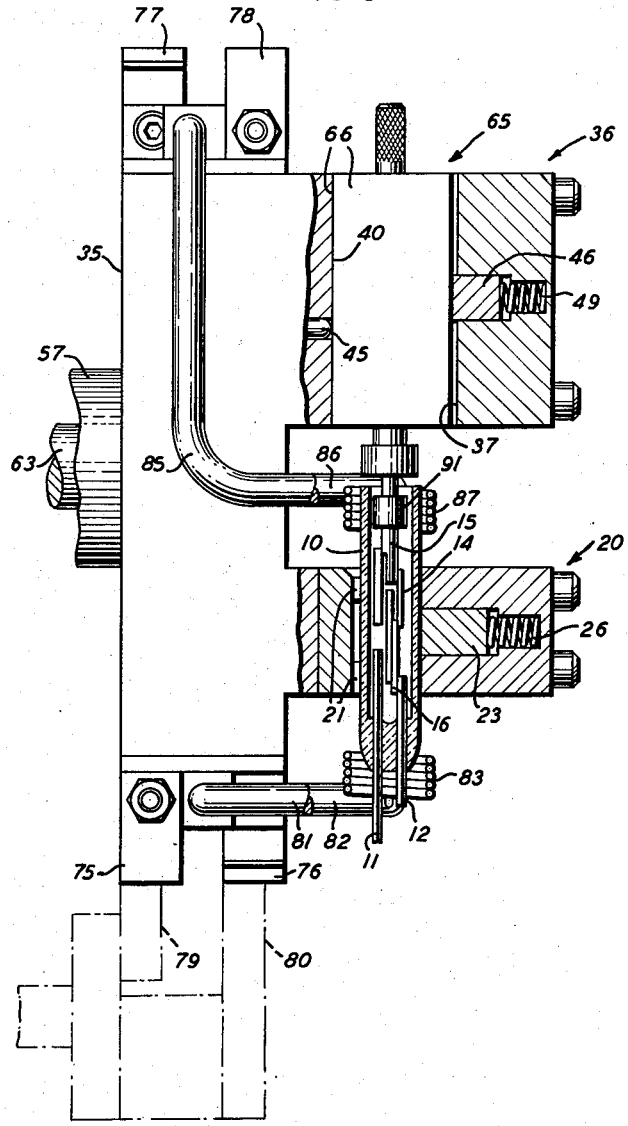
Fig. 5 illustrates the same structure shown in Fig. 4 after the contacts have been sealed in the lower end of the glass tube, the contact holder removed and the armature holder with the armature mounted in place.

Contact springs 75—76 and 77—78 are mounted as illustrated, particularly in Figs. 1–5 inclusive, upon opposite ends of the head 35 and of the contours illustrated in Fig. 3 for movement selectively to engagement with terminals 79 and 80. The contacts 75 and 76 are electrically connected to leads 81 and 82 of a heating unit 83 while the contacts 77 and 78 are electrically connected to leads 85 and 86 of the heating unit 87. The heating units are positioned in alignment with each other upon opposite sides of the chuck 20 to surround the adjacent ends of the glass tube 10, these units providing the heat necessary to fuse the ends of the tubes. The terminals 79 and 80 are included in an electrical circuit (not shown) to supply the necessary energy to the heating units 83 and 87 when their respective contacts are moved into engagement with the terminals.

Considering now the operation of the apparatus and the steps of the method completed through the aid of the apparatus, attention is first directed to the chuck 20. The glass tube, during the first step of the method, is mounted at a given position, this position being determined by the chuck. The chuck 20 is opened through the actuation of the lever 31, the tube disposed in place and the chuck allowed to move into its closed position. This step of the method may be carried out if so desired with the head 35 turned 90° from the normal position shown in Fig. 1. This may be preferred in that the contacts 75—76 and 77—78 are out of engagement with the terminals 79 and 80 should it be desirable to have the circuit, including the terminals, effective at all times for closing during movement of the contacts into engagement with the terminals. Furthermore, if desired, a suitable switch may be included in the circuit for movement into open position prior to mounting the glass tube in the chuck 20 and thereby eliminating the necessity of turning the head 90°.

In actual practice a number of the holders 41 and 65 are provided so that they may be loaded with their contacts and armatures. Furthermore, to assist in the sealing of the ends of the glass tube, glass beads are provided for both the contacts and the armature supplying the additional material needed to completely seal the ends of the tube about their respective units, namely, the contacts and the armature. The beads for the contacts are shown in Fig. 4 and indicated by reference numeral 90 while the bead for the armature is shown in Fig. 5 and indicated by reference numeral 91.

The next step of the method includes the location of the contacts at given spaced positions with respect to each other and with respect to the center line of the tube. This is made possible through the reference surfaces 40 in the support 36 corresponding to the reference surfaces 43 of the holder 41 and the operation of the latch 46 to hold the reference surfaces of the holder 41 into intimate engagement with the reference surfaces of the support. When this has been accomplished, the next step of the method includes heating the lower end of the tube and the glass beads 90 to fuse these glass portions into a common mass while the contacts are firmly held in their respective positions, to seal them in place and complete one end of the switch. When this has been accomplished and the fused glass allowed to cool sufficiently to solidify, the holder 41 is removed, leaving the contacts 11 and 12 in place. Removal of the holder 41 is accomplished after actuation of the handlever 62, the cam 60, the rods 56 and 51, move the latch 46 into open position against its spring 49.

The next step of the method includes accurately locating the armature 14 within the glass tube so that the leading end of the armature will engage one pair of contacts and be positioned between the pairs of contacts. The tube with the contacts remains in the chuck 20 and after the holder 41 has been removed from the support 36, the unit 65 with the armature 14 may be located in the support utilizing the reference surfaces 40 in cooperation with the reference surfaces 66 of the holder 65. Through the closing of the latch 46, the holder 65 and the armature 14 are accurately positioned with respect to the glass tube 10 and the contacts 11 and 12. This step of the method having been completed, attention is next directed to Fig. 6 which illustrates the positioning of the head 35 during the next step of the method. The head 35 has been moved into the position shown in Fig. 6 through the actuation of the lever 71 moving the contacts 75 and 76 out of engagement with the terminal 79—80 and moving the contacts 77 and 78 into contact with the terminals. In this manner the heating unit 87 is included in the circuit to heat the adjacent end of the glass tube 10 and the bead 91 to fuse them about the armature thus sealing it in place and completing this portion of the mercury switch. After the last sealing step has been completed and the tube allowed to cool sufficiently to solidify the sealed end, the holder 65 may be removed after which the completed article may be removed from the chuck 20.

The operation of the apparatus may be continued to carry out the various steps of the method of first locating a receptacle or glass tube in a given position, locating contacts in one end of the receptacle or tube at known positions with respect to the center line of the tube, fusing the adjacent end of the tube to seal the contacts therein, locating an armature in the glass tube with the leading ends of the armature disposed at desired positions with respect to the contacts and sealing the armature in the opposite end of the tube. All of these steps of the method are assured through the utilization of reference surfaces of the support located at known positions with respect to the chuck wherein the glass tube is mounted to successfully receive the holders for the contacts and the armature whereby these parts of the article to be assembled will be accurately located within the glass tube at known positions with respect to the ends of the tube and the center line thereof.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for forming glass sealed conductive parts in combination with holders for removably holding the parts and having like reference surfaces disposed at known positions relative to their respective parts, the apparatus comprising a shaft, a head rotatably supported on the shaft, a chuck supported by the head to removably secure a glass tube in a given position, a support mounted on the head and having a reference surface disposed at a given position relative to the tube in the chuck, means to successively secure the holders on the support with each reference surface thereof engaging the reference surface of the support to successively locate the parts at known positions in opposite ends of the glass tube, electrically energizable heating elements supported by the head adjacent the ends of the tube and having contacts disposed at opposed positions on the head, and terminals included in an electrical circuit mounted at a fixed position adjacent the head to be successively engaged by the contacts to energize the heating elements to fuse the ends of the tube.

2. An apparatus for forming glass sealed conductive parts in combination with holders for removably holding the parts and having like reference surfaces disposed at known positions relative to their respective parts, the apparatus comprising a shaft, a head rotatably supported on the shaft, a chuck supported by the head to removably secure a glass tube in a given position, a support mounted on the head and having a reference surface disposed at a given position relative to the tube in the chuck, means to successively secure the holders on the support with each reference surface thereof engaging the reference surface of the support to successively locate the parts at known positions in opposite ends of the glass tube, electrically energizable heating elements supported by the head adjacent the ends of the tube and having contacts disposed at opposed positions on the head, terminals included in an electrical circuit mounted at a fixed position adjacent the head, and means to rotate the shaft and head to move the contacts successively into engagement with the terminals to energize the heating elements to fuse the ends of the tube.

3. An apparatus for forming glass sealed conductive parts in combination with holders for removably holding the parts and having like reference surfaces disposed at known positions relative to their respective parts, the apparatus comprising a chuck to removably secure a glass tube in a given position, a support having a reference surface disposed at a given position relative to the glass tube, a latch carried by the support and normally urged to successively secure the holders on the support with each reference surface thereof engaging the reference surface of the support to successively locate the parts at known positions in opposite ends of the tube, heating elements rendered effective alternately to fuse the ends of the tube about the parts, and means actuable to move the latch into open position.

4. An apparatus for forming glass sealed conductive parts in combination with holders for removably holding the parts and having like reference surfaces disposed at known positions relative to their respective parts, the apparatus comprising a shaft, a head rotatably supported on the shaft, a chuck supported by the head to removably secure a glass tube in a given position, a support mounted on the head and having an aperture including relatively positioned reference surfaces corresponding in contour and relative positions to the reference surfaces of the holders, a latch carried by the support and normally urged to successively secure the holders on the support with each reference surface thereof engaging the reference surface of the support to successively locate the parts at known positions in opposite ends of the tube, electrically energizable heating elements supported by the head adjacent the ends of the tube and having contacts disposed at opposed positions on the head, and terminals included in an electrical circuit mounted at a fixed position adjacent the head to be successively engaged by the contacts to energize the heating elements to fuse the ends of the tube.

CARL HERZOG.

References Cited in the file of this patent

UNITED STATES PATENTS

| Number | Name | Date |
|---|---|---|
| 2,174,853 | Bowie | Oct. 3, 1939 |
| 2,361,517 | White et al | Oct. 31, 1944 |
| 2,402,029 | Dinnick et al. | June 11, 1946 |
| 2,406,021 | Little | Aug. 20, 1946 |
| 2,523,903 | Ellwood | Sept. 26, 1950 |